United States Patent [19]
Cutler

[11] 4,035,706
[45] July 12, 1977

[54] OFFSET PATH GENERATING SYSTEM PARTICULARLY USEFUL FOR NUMERICAL CONTROL MACHINES

[76] Inventor: Hymie Cutler, 16230 Santa Rosa, Detroit, Mich. 48221

[21] Appl. No.: 562,771

[22] Filed: Mar. 27, 1975

Related U.S. Application Data

[63] Continuation-in-part of Ser. No. 382,862, July 26, 1973, Pat. No. 3,875,382.

[51] Int. Cl.² .................................. G05B 19/24
[52] U.S. Cl. ........................................... 318/572
[58] Field of Search .............. 235/151.11; 318/572

[56] References Cited

U.S. PATENT DOCUMENTS

| | | | |
|---|---|---|---|
| 3,270,186 | 8/1966 | Centner | 235/151.11 |
| 3,665,280 | 5/1972 | Payne et al. | 318/572 |
| 3,679,955 | 7/1972 | Rhoades | 318/572 |
| 3,770,947 | 11/1973 | Deily | 235/151.11 |
| 3,866,027 | 2/1975 | Cutler et al. | 235/151.11 |
| 3,939,330 | 2/1976 | Fluet | 235/151.11 |

Primary Examiner—James R. Scott
Assistant Examiner—John J. Feldhaus
Attorney, Agent, or Firm—Benjamin J. Barish

[57] ABSTRACT

An offset path generating system is described for generating in Cartisian coordinates a prescribed offset, or deviation, from a programmed path at the same time the original path is being generated. The described apparatus is particularly useful for generating the tool center path of N/C machines, and includes: (1) an offset generating system, which generates X-axis and Y-axis drive pulses defining an offset path of motion offset from a programmed path by a prescribed magnitude, this being the radius of the machine tool; (2) a slope-discontinuity control, effective to control the offset path upon the inputting of a first programmed motion followed by a second programmed motion having a discontinuity in slope between them, such as in the case of corners; (3) an offset turn-on control effective, upon receiving an Offset-Turn-On Instruction, to disable the programmed path generator from generating the programmed motion while it generates offset axes-pulses at a prescribed velocity until the offset is at a right angle to the initial path of the programmed motion, at which time the programmed path generator is re-enabled to generate the programmed moton; and (4) an offset turn-off control effective, upon receiving an Offset-Turn-Off Instruction, to disable the programmed path generator from generating the programmed motion while it generates offset axes-pulses at the prescribed velocity to move the offset to zero, at which time the programmed path generator is re-enabled to generate the programmed motion.

22 Claims, 13 Drawing Figures linear programmed path
$X_G = -19$, $Y_G = +48$ prescribed offset
$R_p = 26$

OFFSET PATH GENERATING SYSTEM PARTICULARLY USEFUL FOR NUMERICAL CONTROL MACHINES

RELATED APPLICATIONS

This application is a continuation-in-part of my pending application Ser. No. 382,862 filed July 26, 1973 now U.S. Pat. No. 3,875,382 granted Apr. 1, 1975.

BACKGROUND OF THE INVENTION

The present invention relates to offset path generating apparatus, and particularly to such apparatus useful for generating the tool center path of numerical control (N/C) machines.

In my copending U.S. Pat. application Ser. No. 382,862 filed July 26, 1973 (now U.S. Pat. No. 3,875,382), there is described a technique for generating a two-lobed epitrochoid contour for producing the Wankle rotary engine housing. Among the systems described in that application is an offset control for generating an offset path of motion deviating from a programmed path of motion by a prescribed magnitude. The system in that patent application is particularly described for generating the center path of the tool tracing an epitrochoid contour, but may be used with respect to any programmed path of motion, such as a linear, circular, parabolic, or other mathematically-defined loci. The present application is directed to improvements in the offset path generating system described in that patent application.

Numerical control (N/C) apparatus is generally supplied with program instructions that define a particular profile or contour path with respect to a particular tool-size radius. The program path of the tool center is generally computed off-line prior to use. Accordingly, if a larger or a smaller sized tool is desired to be used than was assumed in determining the programmed path, such as in the case when sharpening a tool or dressing a grinding wheel, it is generally necessary to compute a new program off-line before the N/C machine can generate the path with the changed tool size. Further, if several passes are to be made over the same contour, even though each path is identical except for a change in the size of the cutter assumed in calculating the path, each path has to be repeated in the program thus necessitating a substantial extension in the length of the program and in the memory storage capacity required. In addition, the complexity of the procedure in calculating the tool offset off-line makes it difficult for a machine operator to program an N/C machine directly from a part print.

Further, in the prior art currently in use for N/C systems, tool offsets are generally effectuated by open-loop biasing of coordinate axes with analog voltages. This introduces errors because of the inherent limitations of analog methods. One such limitation is the range of values that can be realized without significant errors. Another, is the error introduced by variations in the ambient temperatures. A further source of error is that when turning on or off the tool offset, or when accommodating path discontinuities or any rapid changes of direction, the axes offset rate of response is dependent on fixed time constants. In addition, analog systems require calibrations performed by skilled personnel.

My U.S. Pat. application Ser. No. 382,862 (now U.S. Pat. No. 3,875,382) describes a digital apparatus for generating drive axes-pulses for producing an offset path of motion offset from a programmed path of motion by a prescribed magnitude. That system, briefly, includes: data input means for inputting data specifying the programmed path of motion and the prescribed offset magnitude; a program path generator generating program axes-pulses defining the programmed path of motion specified by the input data; an offset generator generating offset axes-pulses defining an offset vector of a magnitude equal to the prescribed offset magnitude; and an output mixer algebraically combining the program axes-pulses and the offset axes-pulses and outputting same as the drive axes-pulses for producing the offset path of motion.

Such an offset path generating system is particularly useful for generating the tool center path of N/C machines. Being completely digital, it has no limitation as to the amount of offset, nor does it require any calibrations, nor does its rate of response limit the velocity at which contouring may be performed. It may be embodied in a hardwired control that can be appended to existing N/C systems. Also, it utilizes simple control algorithms to generate Cartesian coordinate axes motion command pulses that are algebraically combined with the axes motion command pulses of the original programmed path and which are of the same pulse weight.

SUMMARY OF THE PRESENT INVENTION

A broad object of the present invention is to provide an improved offset path generating apparatus, which apparatus is particularly useful for generating tool offsets in order to reduce the cost of using an N/C machine by allowing tooling to be used longer, programming to be simplified, and smaller lot sizes to be economical.

A more particular object of the present invention is to provide improvements in the offset path generating apparatus described in my pending U.S. Pat. application Ser. No. 382,862.

One improvement is directed to a slope-discontinuity control, effective upon the inputting of a first programmed path of motion followed by a second programmed path of motion having a discontinuity in slope between the first one. Such discontinuities may be present between any programmed curved motions, but are always present when straight lines are programmed, such as in the case of corners. According to this improvement, an arrangement is provided whereby, after one programmed motion has been completed, the next programmed motion is held up while an offset path is generated at a prescribed velocity so as to move the tool center until it is precisely at a predetermined angle (e.g., normal) to the initial slope of the next programmed motion and at the precise offset distance from it. When that offset motion has been completed, the next programmed motion is allowed to take place.

More particularly, the slope-discontinuity control is effective upon the completion of the first programmed path of motion, (a) to disable the program path generator from supplying to the output mixer the program axes-pulses defining the second programmed path of motion; (b) to enable the offset generator to supply to the output mixer sufficient offset axes-pulses to rotate the offset vector until it is at a predetermined angle to the initial slope of the second programmed path of motion and at the prescribed offset magnitude therefrom; (c) and then to re-enable the programmed path generator to supply to the output mixer the program axes-pulses defining the second programmed path of motion.

According to a further feature, the data input means further inputs feedrate data specifying a prescribed offset velocity, the apparatus including means controlling the offset generator to generate the offset axes-pulses at the prescribed offset velocity during the operation of the slope-discontinuity control.

Another improvement described in the present application is an arrangement for providing offset Turn-On and Turn-Off controls as commanded by instructions from the data input. Many part programs require a considerable number of offset turn-on and turn-off operations. This is particularly true when more than one type of tool is utilized in the machining of a part, and also when the same part program is repeated with different values of tool offset for deeper passes until the total depth of cut is reached. The prior art offset control systems in current use generally require the operator to provide calculated offset data for each time the offset is to be turned-on based on the programmed original path at the time of turn-on. In the system of the present invention, the offset path is independent of the programmed path. The offset magnitude need be entered only once, the system automatically responding to an offset Turn-On Instruction or Turn-Off Instruction, to automatically increase the offset to the prescribed magnitude in the case of the former instruction, and to automatically reduce it to zero in the case of the latter instruction, both operations being performed at a prescribed offset velocity.

More particularly, the offset control means includes an offset turn-on control effective upon receipt of an Offset Turn-On Instruction, (a) to disable the programmed path generator from supplying the program axes-pulses to the output mixer; (b) to enable the offset generator to supply the offset axes-pulses to the output mixer until the offset vector is equal to the prescribed offset magnitude and is at a predetermined angle to the slope of the current point on the programmed path of motion; (c) and then to re-enable the programmed path generator to supply the program axes-pulses to the output mixer.

The offset Turn-Off control is effective, upon receipt of the Offset Turn-Off instruction; (a) to disable the programmed path generator from supplying the program axes-pulses to the output mixer; (b) to enable the offset generator to supply offset axes-pulses to the output mixer sufficient to move the offset vector to zero magnitude; (c) and then to re-enable the programmed path generator to supply the program axes-pulses to the output mixer.

Further features and advantages of the invention will be apparent from the description below.

BRIEF DESCRIPTION OF THE DRAWINGS

The invention is herein described, by way of example only, with respect to a preferred embodiment thereof illustrated in the accompanying drawings, wherein.

DESCRIPTION OF THE PREFERRED EMBODIMENT

General Technique for Generating Offset Path

Figure 1:
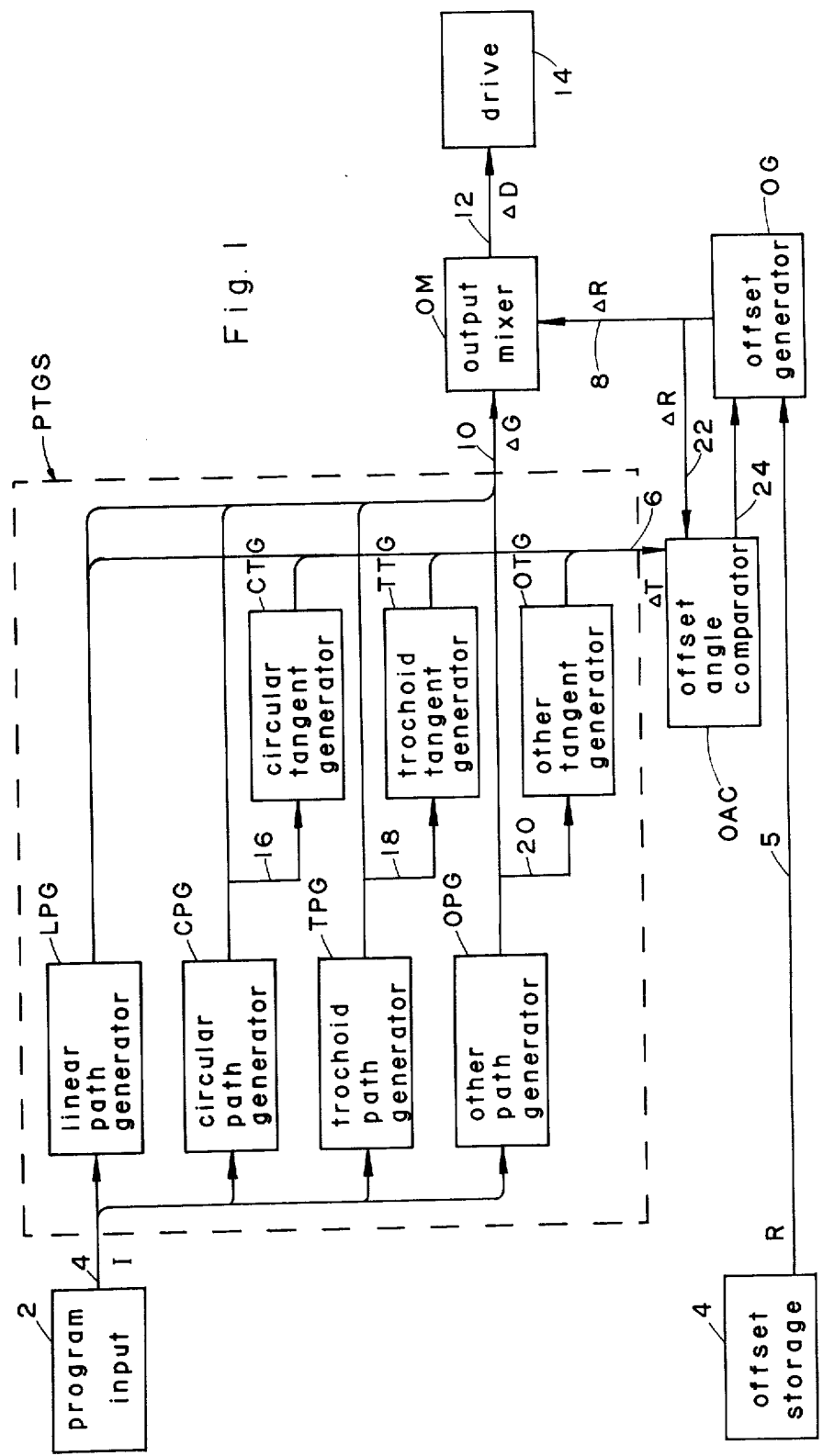
FIG. 1 is a block diagram illustrating a digital tool offset path generating apparatus constructed in accordance with the present invention.
Figure 2:
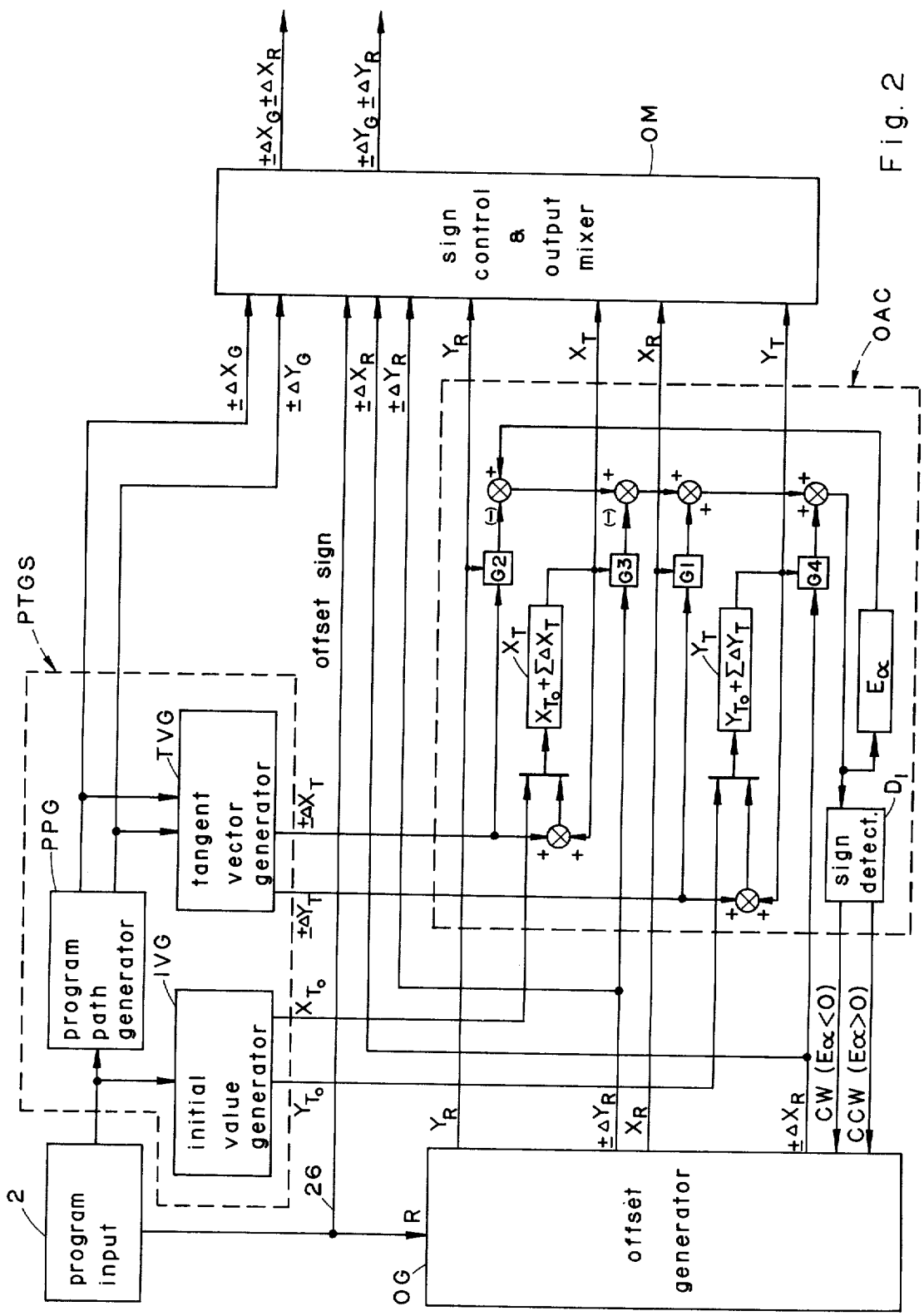
FIG. 2 is a block diagram illustrating more particulars of the system of FIG. 1.

Before proceeding with a description of FIGS. 1 and 2, which illustrate a tool offset path generating system constructed in accordance with the invention, it will be helpful first to explain the general technique used and to refer to the vector diagrams of FIFS. 3a–3d illustrating the various vectors involved.

Figure 3A:
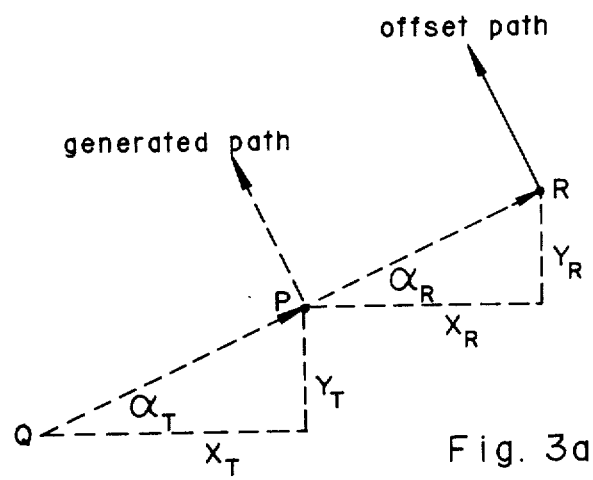
FIGS. 3a–3d are vector diagrams helpful in explaining the operation of the system of FIGS. 1 and 2.

In FIG. 3a, point P is the current position on the particular path that is being generated as per instructions given by the program. That path is generated by a programmed path generator which is a part of the N/C unit to which the digital tool offset system of the present invention is attached to extend the capacity of the control.

Figure 3B:
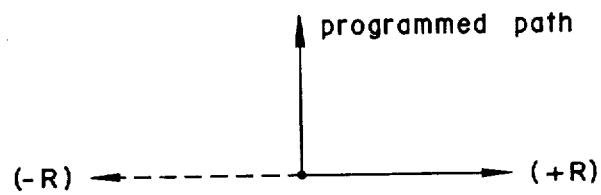

Point-R in FIG. 3a is the offset by the distance-R from the current point-P. FIG. 3b illustrates the sign convention of distance-R. The distances $X_R$ and the $Y_R$ are the axes components of distance-R. Those are quantities that are precisely generated by the described digital tool offset system as a function of the programmed path generated by the N/C unit.

Vector QP (FIG. 3a) is normal to the generated path having axes components $X_T$, $Y_T$ and an angle $\alpha_T$. The digital tool offset system determines the values of $X_T$ and $Y_T$ for the specific curve programmed and from the pulses ($\Delta X_G$, $\Delta Y_G$) generating that curve according to the following relationship:

$$X_T = X_{T_0} + \Sigma(\Delta X_T)$$

$$Y_T = Y_{T_0} + \Sigma(\Delta Y_T) \qquad (1)$$

where $X_{T_0}$ and $Y_{T_0}$ are the axes components of the initial normal to the specific programmed curve. The values of those quantities are determined by the digital tool offset system from the programmed data for the particular curved path.

Figure 3C:
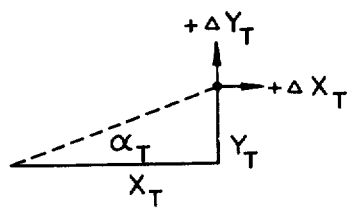
Figure 3D:
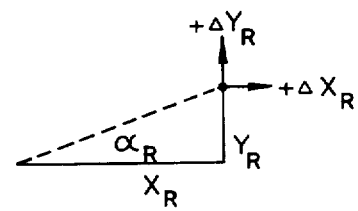

Any change of the direction of the generated programmed path will cause a corresponding change in either $\Delta X_T$ and/or $\Delta Y_T$ (FIG. 3c), thereby changing the value of the angle $\alpha_T$. The digital tool offset system recognizes if angle $\alpha_R$ does not match the angle $\alpha_T$ and causes either $\Delta X_R$ or $\Delta Y_R$ pulses (FIG. 3d) to be produced so as to maintain the relationship ($X_R^2 + Y_R^2 = R^2$) within one pulse while angle $\alpha_R$ is made to match angle $\alpha_T$ as close as a single pulse will allow. The result is that vector-R will follow the path generated by the N/C unit so that it is normal thereto, i.e., to vector QP.

By algebraically adding the pulses ($\Delta X_G$) generated by the N/C unit to produce the particular programmed path and the pulses ($\Delta X_R$) produced by the digital tool offset system, the programmed path will be offset by the distance-R.

It should be noted that basically the digital tool offset system has the capability as described to generate the required motion so that angle $\alpha_R$ will follow the changes in angle $\alpha_T$ while maintaining distance-R. In some applications it may be of use not to have $\alpha_T$ normal to a contour. For example, if a rotary cam shape is defined in terms of Cartesian coordinates, and the $X_T$ and the $Y_T$ quantities are in the axes distances from the origin of the coordinate system to that cam surface, the $\alpha_T$ will be the polar angle. For such a case, the $\alpha_R$ generator would provide a fixed prescribed distance that is radial with respect to the center of that cam shape, rather than producing a tangent to the surface.

General Offset Path Generating System of FIGS. 1 and 2

An offset path generating system constructed in accordance with the foregoing discussion is illustrated generally in the block diagram of FIG. 1, and more particularly in the block diagram of FIG. 2.

With reference first to FIG. 1, there is shown a path and tangent generator system, generally designated PTGS, which receives, via a program input device 2, data (I) prescribing the programmed path of motion. The offset magnitude (R) may be inputted from the same program input 2. FIG. 1 illustrates the arrangement wherein it is stored in a separate input 4. In either event this information is routed via line 5 to the offset generator OG.

The path and tangent generator system PTGS outputs tangent axes-pulses ($\Delta T$) via line 6 to an offset angle comparator OAC which controls the offset generator OG, the output of the latter being offset pulses ($\Delta R$) supplied to an output mixer OM via line 8. System PTGF also outputs program axes-pulses ($\Delta G$) via line 10 to the output mixer OM. The latter mixer algebraically combines the program axes-pulses ($\Delta G$) and the offset axes-pulses ($\Delta R$) and outputs therefrom the drive axes-pulses ($\Delta D$) via line 12 to the axes drives 14 of the N/C machine.

System PTGS may include any desired number of path generators and tangent generators. FIG. 1 illustrates: a linear path generator LPG capable of supplying program pulses ($\Delta G$) via line 10 to the output mixer, and tangent pulses ($\Delta T$) via line 6 to the offset angle comparator OAC. Linear path generator LPG does not require a tangent generator because its output pulses, defining a linear path, also represent the tangent of that path.

System PTGS of FIG. 1 further includes a circular path generator CPG, generating program impulses defining the increments of a circular path of motion supplied via line 10 to output mixer OM. These program pulses are also supplied via line 16 to a circular tangent generator CTG which generates the tangent pulses defining the tangent vector normal to the circular programmed path of motion, the tangent pulses being supplied via line 6 to the offset angle comparator OAC. A circular path generator that may be used is described in my U.S. Pat. No. 3,864,613. Further illustrated in FIG. 1 is a trochoid path generator TPG, which may be the same as illustrated in my copending Application Ser. No. 382,862, supplying program pulses to output mixer OM via line 10 and also, via line 18, to a trochoid tangent generator TTG generating the corresponding tangent pulses and supplying same to the offset angle comparator OAC. Further illustrated in FIG. 1 is any other program path generator (e.g., helical path) generally designated OPG, supplying the program pulses to output mixer OM via line 10 and also via line 20, to a tangent generator OTG generating corresponding tangent pulses supplied to the offset angle comparator OAC.

It will be appreciated that, at any one time, only one of the path generators is operating, providing program pulses to the output mixer OM via line 10 and tangent pulses to the offset angle comparator OAC via line 6.

The offset angle comparator OAC thus receives, via line 6, the tangent axes-pulses ($\Delta T$) of the tangent to the programmed motion. It further receives, via line 22, the offset axes-pulses ($\Delta R$) generated by the offset generator OG. Comparator OAC continuously compares the offset vector angle ($\alpha_R$) as defined by the offset pulses with the tangent vector angle ($\alpha_T$) as defined by the tangent pulses, and controls the offset generator OG via line 24 to cause the offset vector angle to follow the tangent angle (FIGS. 3a–3d described above).

The logic of the offset angle comparator OAC is shown in FIG. 2. One set of inputs to this logic is the $\Delta X_T$ and $\Delta Y_T$ pulses that represent the change of the normal to the current point of the programmed path and thus indicate angle $\Delta_T$. The other set of inputs is $\Delta X_R$, $\Delta Y_R$ and $Y_R$ which indicate angle $\alpha_R$. When angle comparator OAC recognizes that $\alpha_R \neq \alpha_T$, it outputs either a "CW" or a "CCW" signal, which controls the offset generator OG to cause the tool offset vector to rotate either clockwise or counterclockwise so that angle $\alpha_R$ will match angle $\alpha_T$.

FIG. 2 also illustrated in block form more particulars of the path and tangent generator system PTGS. Thus, this system includes a programmed path generator PPG (e.g., the previously mentioned circular path generator CPG or trochoid path generator TPC, FIG. 1), which supplies the program axes-pulses ($\Delta X_G$, $\Delta Y_G$) to the output mixer OM, and also to the tangent vector generator TVG, the latter producing the tangent-axes pulses ($\Delta X_T$, $\Delta Y_T$) to the offset angle comparator OAC. The system also includes an initial value generator IVG which generates values ($X_{T0}$, $Y_{T0}$) representing the axial components of the normal to the initial point of the programmed motion. For each particular path (linear, circular etc.,) there is an associated dedicated generator for those initial values activated by the program identification of the type of curve, and utilizing the data programmed for that curve. This generator outputs the values $X_{T0}$ and $Y_{T0}$ to the offset angle comparator OAC.

The offset generator OG, which is preferably a circle generator of the type disclosed in my U.S. Pat. No. 3,864,613, as mentioned above, outputs offset axes-pulses $\Delta X_R$, $\Delta Y_R$ defining the increments of motion of the offset vector R. It also includes X-axis and Y-axis registers (schematically shown by the $X_R$ and $Y_R$ blocks in FIG. 2) which accumulate the generated offset X-axes-pulses and Y-axes-pulses and outputs same as values $X_R$ and $Y_R$ to the offset angle comparator OAC. The foregoing outputs ($\Delta X_R$, $\Delta R_R$, $X_R$, $Y_R$) from the offset generator OG to the offset angle comparator OAC indicate angle $\alpha_R$.

The offset angle comparator OAC includes X-axis and Y-axis registers $X_T$, $Y_T$, which accumulate the tangent axes-pulses. It further includes circuit means, comprising an error register $E\alpha$ and a sign detector DI, for causing the offset circle generator OG to generate offset axes-pulses in response to the generation of the tangent axes-pulses, such that the offset vector angle $\alpha_R$ defined by the quantities in the offset registers $X_R$, $Y_R$ of the offset generator follows the tangent vector angle $\alpha_T$ defined by the quantities in the tangent register $X_T$, $Y_T$.

The alogarithms employed by the logic of the offset angle comparator OAC to produce the precise match of the angles $\alpha_R$ and $\alpha_T$ are as follows:

$$\underbrace{E_\alpha\rfloor}_{\text{old}} + (\Delta Y_T \cdot X_R - \Delta X_T \cdot Y_R) - (\Delta Y_R \cdot X_T - \Delta X_R \cdot Y_T) = \underbrace{E_\alpha\rfloor}_{\text{new}} \quad (2)$$

$$\{CW\} = \{E_\alpha < 0\}$$
$$\{CCW\} = \{E_\alpha > 0\} \quad (3)$$

$$X_T = X_T + \Sigma \Delta X_{T_0}$$
$$Y_T = Y_T + \Sigma \Delta Y_{T_0} \quad (4)$$

The quantities $X_R$, $Y_R$, $X_T$, and $Y_T$ are always handled as positive numbers as far as this logic is concerned. If they are actually negative numbers, the output mixer OM will take this into account, as described more particularly below. The pulses $\Delta X_R$, $\Delta Y_R$, $\Delta X_T$ or $\Delta Y_T$, if present, will have a value of ±1 with the same pulse weight as that of the N/C path generator outputs. If the pulse is negative, then the arithmetic operation it enables in equation (2) will be inverted from what is there shown.

In order to implement the foregoing alogarithms, the offset angle comparator OAC includes a first circuit having a first gate G1 for adding into the error register $E\alpha$ each tangent Y-axis and pulse $\Delta Y_T$ upon the presence of a quantity $X_R$ in the offset X-axis register; a second circuit including a second gate G2 for subtracting from the error register each tangent X-axis pulse $\Delta X_T$ upon the presence of a quantity $Y_R$ in the Y-axis offset register; a third circuit including a third gate G3 for subtracting from the error register each offset Y-axis pulse $\Delta Y_R$ upon the presence of a quantity $X_T$ in the tangent X-axis register; and a fourth circuit including a fourth gate G4 for adding into the error register each offset X-axis pulse $X_R$ upon the presence of a quantity $Y_T$ in the tangent Y-axis register. (see relationship 2 above). The sign detector D1 continuously monitors the sign in the error register $E_\alpha$; and when that quantity is less than zero, it produces a CW signal to the offset generator OG to rotate the offset circle vector R in the clockwise direction, and when the quantity is greater than zero, it produces a CCW signal to rotate the offset vector in the counter-clockwise direction (relationship 3 above).

Thus, if the N/C path generator PPG produces either a $\Delta X_G$ or a $\Delta Y_G$ pulse which causes an increase in angle $\alpha_T$, then either $+\Delta Y_T$ or $-\Delta X_T$ pulses will result. These pulses will cause the error register $E_\alpha$ to become positive in value. At the same time the $\Delta X_T$ or $\Delta Y_T$ pulses will be algebraically summed into their respective registers, $X_T$ and $Y_T$. With the error register $E_\alpha > 0$, a CCW signal will be produced by the sign detector D1 to cause the offset generator OG to rotate in a counter-clockwise direction producing either a $-\Delta X_R$ or a $+\Delta Y_R$ pulse. Either of these pulses will cause error register $E\alpha$ to become less positive and approach zero. When the error register $E\alpha$ becomes either zero or negative, further rotation of the offset generator OG will stop until additional $\Delta X_T$ or $\Delta Y_T$ pulses are produced.

The foregoing describes the operation for an N/C programmed path motion that causes angle $\alpha_T$ increase. A similar action occurs in the opposite direction if angle $\alpha_T$ decreases. Thus angle $\alpha_R$, the angle of the offset vector, is caused to match the angle $\alpha_T$ which was generated so that is is normal to the current generated point on the N/C programmed path.

Figure 4:
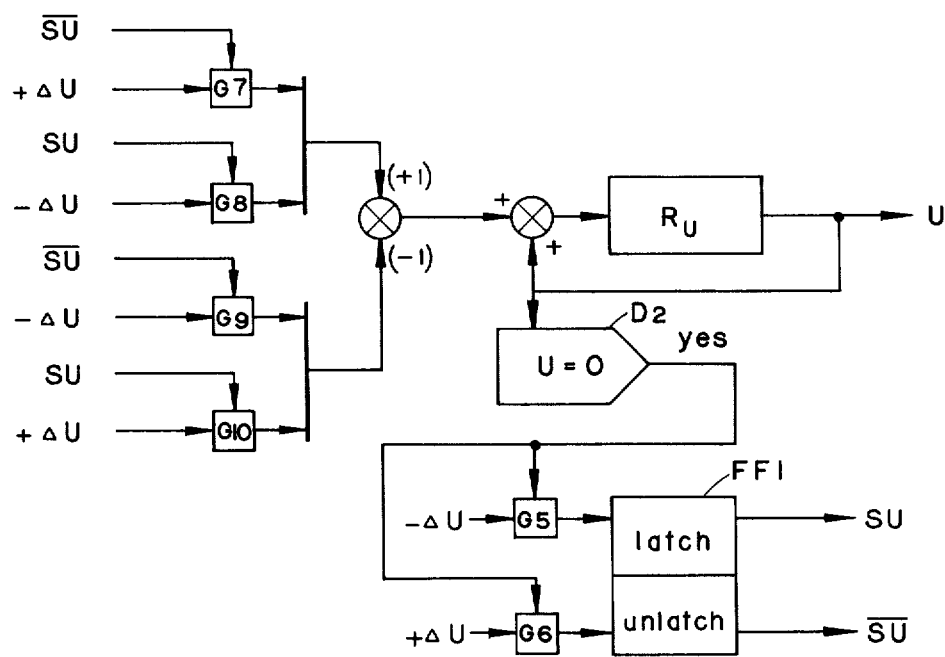
FIG. 4 is a block diagram of the typical sign logic for sign control in the output mixer in the system of FIGS. 1 and 2.

Sign Control in Output Mixer OM (FIG. 4)

The output mixer OM includes a logic which algebraically combines the like axes-pulses from the N/C path generator PPG and the offset generator OG to produce the X and Y axes-pulses supplied to their respective actuators so as to produce the offset path. To provide a somewhat simpler logic arrangement, the offset angle comparator OAC handles all quantities as if they were in the same quadrant, that is as positive numbers. The actual signs of the quantities are supplied via line 26 and are stored in the logic of the output mixer OM. These signals have to be taken into account during the mixing of the original programmed path axes-pulses and the offset axes-pulses.

FIG. 4 illustrates a sign logic that may be included in the output mixer OM for storing the actual signs of the quantities. For purposes of simplifying the description, the sign logic illustrated in FIG. 4 is a typical one for all the quantities $X_R$, $Y_R$, $X_T$, $Y_T$, where "U" may represent any of these quantities.

The sign logic includes a register $R_U$ for accumulating the respective quantity U which quantity is always handled as a true number (kept positive). For this purpose, the logic provides an arrangement comprising a "zero" detector D2 which detects whether the quantity U is zero, and if so, it operates a flip-flop latch FF1 provided for the respective quantity to produce an output "SU" which may be at a logic-one state (SU) or at a logic-zero state ($\overline{SU}$). The respective quantity pulses ($+\Delta U$, $-\Delta U$) are inputted into the respective flip-flop FF1 via a pair of gates G5, G6, controlled by the zero detector D2, such that logic-one output (SU) is produced from the flip-flop when the quantity "U" is a negative number, and a logic-zero ($\overline{SU}$) is produced when the quantity is a positive number.

The above sign signals are used to route the pulse signals via additional gates G7–G10, such that the pulse signals are algebraically added into the U-register $R_U$ when the pulse signal is positive ($+\Delta U$) and the sign signal is a logic-zero ($\overline{SU}$), or when the pulse signal is negative ($-\Delta U$) and the sign signal is a logic-one (SU); and are algebraically subtracted from register $R_U$ when the pulse signal is negative ($-\Delta U$) and the signal is logic-zero ($\overline{SU}$), or when the pulse signal is positive ($+\Delta U$) and the sign signal is logic-one (SU).

It is thus seen that the gating shown in FIG. 4 always maintains the contents of the respective quantity register $R_U$ as a true number (positive), and when a zero crossing occurs, makes a change in the state of the associated flip-flop (FF1) representing the sign of the respective quantity.

These signs are taken into account during the mixing of the program motion pulses and the offset pulses in the output mixer OM.

The following truth table indicates, for any given combination of input signs, what the output must be. The chart is derived from the fact of geometry that if the associated sign is negative, the output sign need to be complemented; otherwise it remains unchanged. Similarly if the sign of the offset-R is negative, then both $\Delta X_R$ and $\Delta Y_R$ signs have to be complemented; otherwise they do not.

TABLE 1

| Input Signals Logic State | | | Signs from the Output Mixer | |
|---|---|---|---|---|
| $SX_T$ | $SY_T$ | SR | $\pm\Delta X_R$ in | $\pm\Delta Y_R$ in |
| 0 | 0 | 0 | ± | ± |
| 1 | 0 | 0 | ± | ± |
| 1 | 1 | 0 | ± | ± |
| 0 | 1 | 0 | ± | ± |
| 0 | 0 | 1 | ± | ± |
| 1 | 0 | 1 | ± | ± |
| 1 | 1 | 1 | ± | ± |
| 0 | 1 | 1 | ± | ± |

Figure 5A:
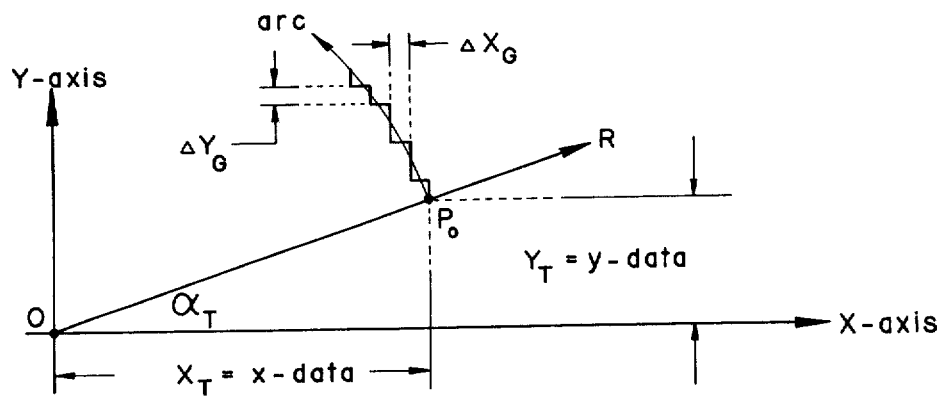
FIGS. 5a and 5b are further vector diagrams helpful in understanding the described system.

Tangent Vector Generator (TVG) Operation (FIG. 5a)

As indicated above, the described digital tool offset system requires that for each mathematically-defined programmed path, the associated values of $X_{T_0}$, $Y_{T_0}$, $\Delta X_T$ and $\Delta Y_T$ be generated by logic hardware dedicated to perform the necessary operations for the specific path. The program needs to supply a signal identifying the type of curve that the N/C unit is to generate as well as its parameters.

The generation of the tangent vector for a programmed trochoid path is described in my copending U.S. patent application Ser. No. 382,862 wherein it was shown:

$$\Delta X_T + \Delta X_1 + 3(\Delta X_2)$$

$$\Delta Y_T = \Delta Y_1 + 3(\Delta Y_2) \quad (5)$$

$$X_T = X_{T_0} + \Sigma(\Delta X_T)$$

$$Y_T = Y_{T_0} + \Sigma(\Delta Y_T) \quad (6)$$

the subscript quantities being the same as defined earlier. As also defined earlier:

$$\Delta X_G = \Delta X_1 + \Delta X_2$$

$$\Delta Y_G = \Delta Y_1 + \Delta Y_2 \quad (7)$$

If the trochoid is started with its minor diameter on the positive X-axis of the coordinate system, the:

| (8) | $Y_{T_0} = 0$ | initially | $SX_T = 0$ |
|---|---|---|---|
| | $X_{T_0} = R_1 + 3R_2$ | | $SY_T = 0$ |

The generation of the tangent vector for a programmed circular path is illustrated in FIG. 5a, wherein: $P_0$ is the initial point of the programmed circular arc. This initial point is defined by what is labeled "x-data" and "y-data". For N/C circular path programming, such initial point is commonly identified with an $i$ and a $j$ letters for the address of that data. Accordingly, by inspection of FIG. 5a it can be seen that:

$$X_T = |\text{i-data}|$$

$$Y_T = |\text{j-data}| \quad (9)$$

From FIG. 5a the following is seen for the case where offset-R is positive:

a. For a programmed direction of the circular arc that is counter-clockwise:

| initial set | $SX_T = Si$ | [same logic state] |
|---|---|---|
| initial set | $SY_T = Sj$ | [same logic state] |
| | $\pm\Delta X_T = \pm\Delta X_G$ | |
| | $\pm\Delta Y_T = \pm\Delta Y_G$ | | b. for a programmed direction of the circular arc that is clockwise:

| initial set | $SX_T = Si$ | [opposite logic state] |
|---|---|---|
| initial set | $SY_T = Sj$ | [opposite logic state] |
| | $\pm\Delta X_T = \pm\Delta_{XG}$ | |
| | $\pm\Delta Y_T = YG$ | |

No special arrangement is required for generating the tangent vector for a programmed linear path, because during the generation of a programmed straight line path, the tool offsets remain unchanged. However, between linear motion blocks, a rotation of the tool offset vector needs to take place to align it normal to the new path. This is described more particularly below, particularly with reference to FIGS. 5b, 6 and 7.

Figure 5B:
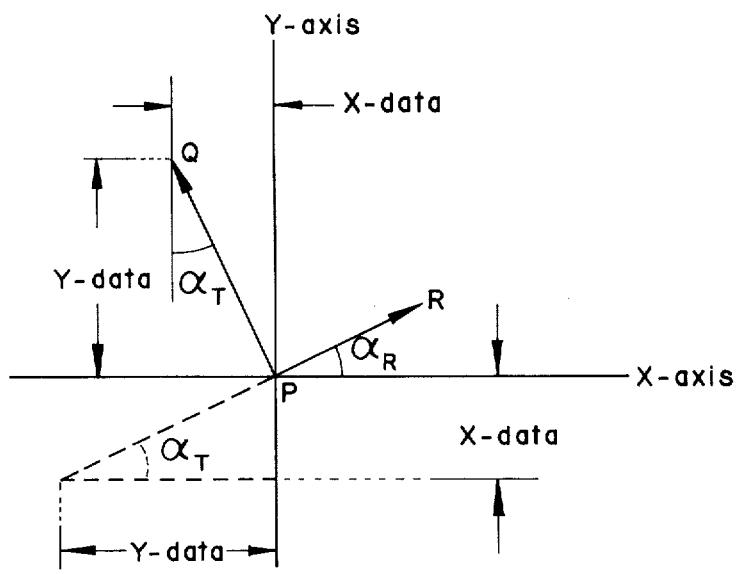
Figure 6:
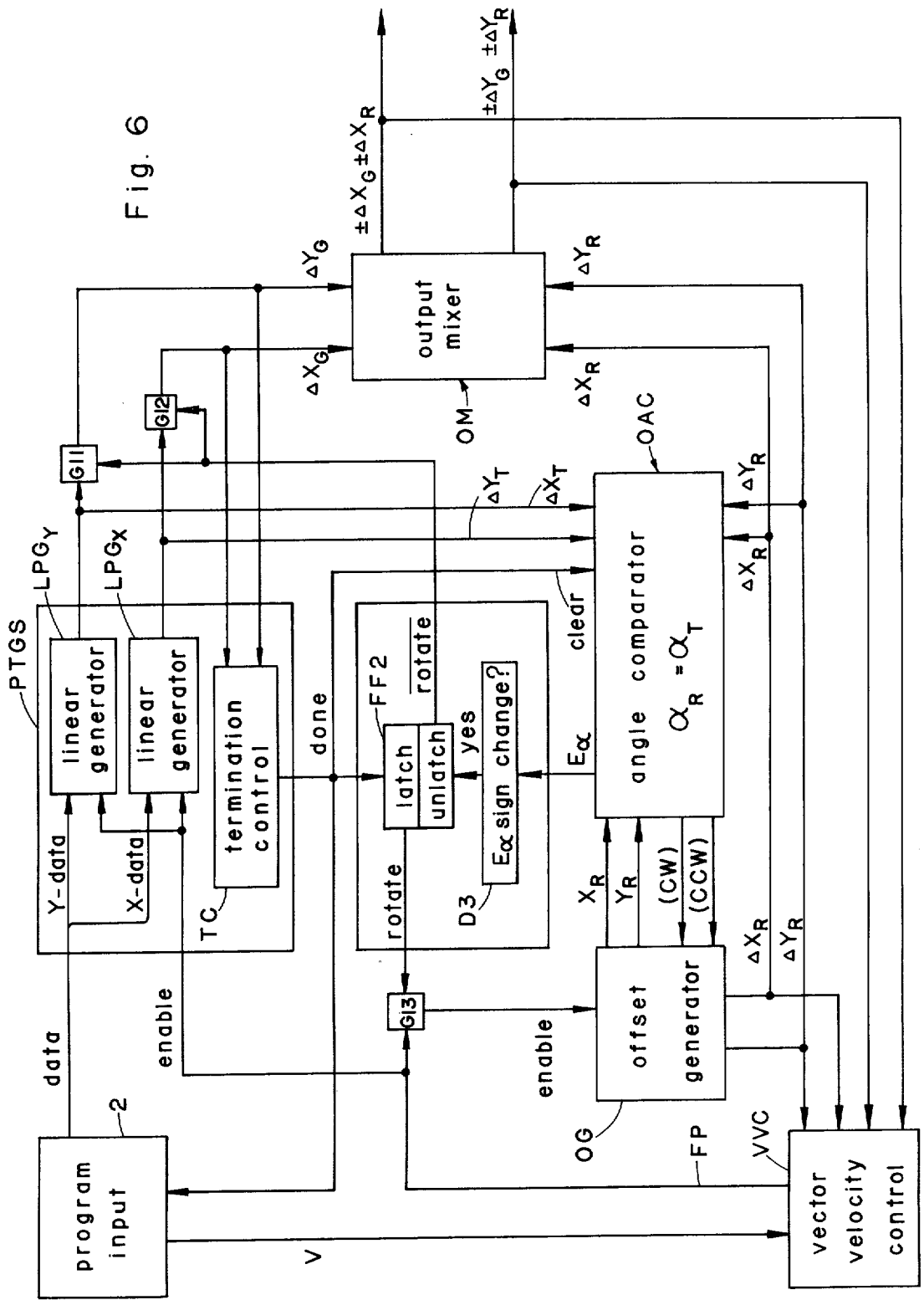
FIG. 6 is a block diagram of the portion of the offset path generating system involved in the slope-discontinuity control.
Figure 7:
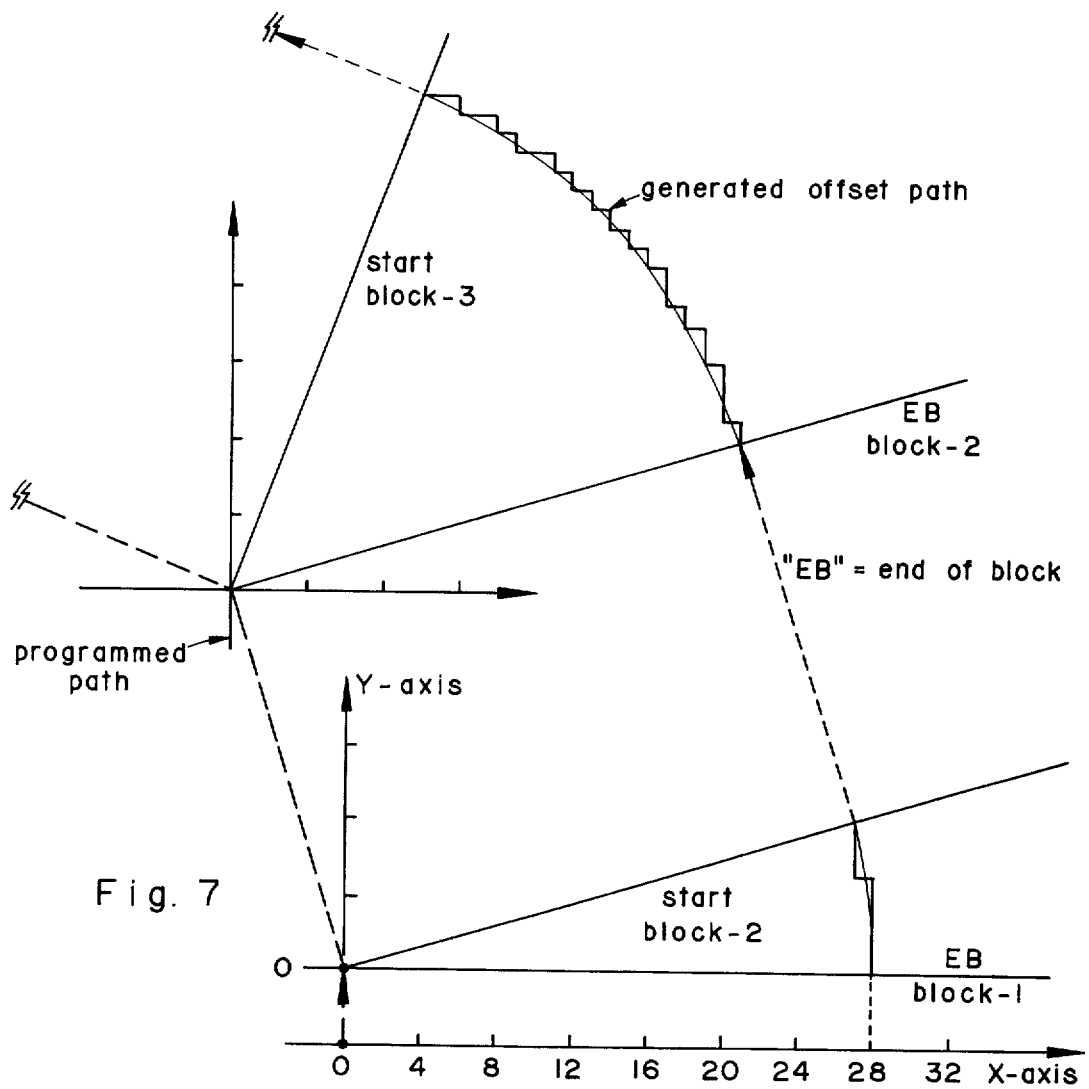
FIG. 7 illustrates an example of the tool offset produced as a result of the operation of the slope-continuity control of FIG. 6.

Offset Slope Discontinuity Control (FIGS. 5b, 6 and 7)

As described earlier, a programmed motion will often start with a slope that differs from the slope at the completion of the last programmed motion. Such a situation is always the case for linear paths. In the analog methods of providing tool offset currently being marketed, each axis offset is controlled by circuits that establish fixed time-constants for an exponential rate of change of the value. Because those tool offset values, when achieved by analog methods, are biased into the servo error junction, there is a need for tie programming of dwells at corners (change of slope) so the new offset motion will not begin until the actual motion has been completed. Further, a portion of the servo following error may be cancelled (or increased, depending on the motion direction versus the offset direction) due to that axis offset bias of the servo error junction so that it is necessary to reduce the maximum contouring velocity in order to keep within the acceleration and deceleration capabilities provided by the servo following error.

In the present invention, the axis offset pulses motions are supplied in the form of digital command pulses that are algebraically summed in with the pulses generated by the N/C unit to produce the originally programmed path. Therefore, the servo following error is not affected. Also, no reduction of the maximum contouring rates is necessary for any amount of offset that is utilized. The digital tool offset system initiates the generated motion at the programmed velocity around corners immediately at the completion of the one programmed motion; and when the offset is normal to the next programmed motion, that next motion will begin. As a result, the velocity around a corner is smooth and at a prescribed value. No time is wasted waiting for exponential decays to settle, and the need for programmed dwells at the corners for the purpose of improving tool offset dynamic accuracy is eliminated.

More particularly, the slope-discontinuity control in the described system is effective, upon completion of each programmed path of motion: (a) to disable the programmed path generator for supplying to the output mixer OM the program axes-pulses defining the next programmed path of motion; (b) to enable the offset circle generator OG to supply to the output mixer OM sufficient offset axes-pulses to rotate the offset vector R until it is at a right angle to the initial slope of the next programmed path of motion and at the prescribed offset magnitude therefrom; (c) and then to re-enable the programmed path generator to supply to the output mixer OM the programmed axes-pulses defining the next programmed path of motion.

FIG. 5b illustrates the method involved in the slope-discontinuity control to cause the tool offset to be rotated so as to be at right angles to the next programmed motion. In FIG. 5b, PQ = programmed linear path vector
PR = tool offset vector, which is perpendicular to PQ From the geometry of FIG. 5b, it can be seen that:

$\Delta X_T$ is proportional to the programmed Y-data
$\Delta Y_T$ is proportional to the programmed X-data so that when angles $\alpha_R$ and $\alpha_T$ are matched, vector-R will be normal to the programmed path PQ. Also from the geometry of FIG. 5b, the following truth table can be obtained for the signs of the quantities where offset-R is considered positive (the output mixer OM handling the case of a negative vector-R as described above).

TABLE 2

| Input States | | Output States Initial Set | |
|---|---|---|---|
| $SX_G$ | $SY_G$ | $SX_T$ | $SY_T$ |
| 0 | 0 | 0 | 1 |
| 1 | 0 | 0 | 0 |
| 1 | 1 | 1 | 0 |
| 0 | 1 | 1 | 1 |

The slope-discontinuity control is more particularly illustrated in the block diagram of FIG. 6, and an example of the offset path generated thereby is illustrated in FIG. 7.

The system shown in the block diagram of FIG. 6 illustrates the operation of the slope-discontinuity control when a first programmed linear path is followed by a second programmed linear path having a different slope. Accordingly, FIG. 6 only shows the linear path generator LPG of the path and tangent generator system PTGS, the two axes of the linear path generator being represented by the two blocks $LPG_X$ and $LPG_Y$. As noted earlier particularly with respect to FIG. 1, the linear path generator does not require a separate tangent generator, since the slope or tangent remains unchanged with each linear path generated.

Systems PTGS receives data from the program input 2 and generates the program axes-pulses $\Delta X_G$, $\Delta Y_G$, which are supplied to the output mixer OM via gates G 11 and G 12. These pulses are also supplied as tangent axes-pulses $\Delta X_T$ and $\Delta Y_T$ to the offset angle comparator OAC. The latter compares the tangent vector represented by these pulses with the offset vector defined by the offset axes-pulses $\Delta_X R$, $\Delta Y_R$, and controls the offset generator OG so that the offset vector angle $\alpha_R$ follows the tangent vector angle $\alpha_T$ as described above with reference to FIG. 2.

The slope discontinuity control illustrated in the block diagram of FIG. 6 further includes a bistable device in the form of a flip-flop FF2 settable to a ROTATE condition or to a NOT-ROTATE (ROTATE) condition. Flip-flop FF2 receives via a sign detector D3 the error signal E $\alpha$ representing the value in the error register E$\alpha$ of the offset angle comparator OAC (FIG. 2), and controls the supply of pulses to the output mixer OM from system PTGS via gates G 11, G12, or from the offset generator OG via a gate G13. Flip-flop FF2 is also controlled by the termination control TC within the path and tangent generator system PTGS which termination control monitors the program axes-pulses inputted into the output mixer OM, and when the inputted data has been completely processed, issues a DONE signal to flip-flop FF2.

The arrangement is such that at the end of each programmed motion, flip-flop FF2 is set in its ROTATE condition by the DONE signal from the termination control TC to turn off gates G11, G12, thereby disabling the programmed path generator PTGS from supplying the program pulses to the output mixer OM, and to turn on gate 13, thereby enabling the offset generator OG to generate and supply offset pulses to the output mixer OM. The offset pulses thus generated and supplied to mixer OM cause the offset vector to be rotated. Angle comparator OAC continuously compares the offset vector angle with the tangent vector angle of the next programmed motion path, as described above, and when the offset vector angle matches or just passes the tangent vector angle, the error register E$\alpha$ in comparator OAC changes flip-flop FF2 to is NOT-ROTATE condition. This turns off gate 13, to terminate the generation and supply of the offset pulses to the output mixer OM, and turns on gates G11 and G12 to re-enable the programmed path generator PTGS to supply the program pulses to the output mixer.

The system illustrated in FIG. 6 further includes a vector velocity control VVC which receives feedrate data V from the program input and produces feed pulses FP gating the programmed path generator PTGS. A vector velocity control system that may be used in that described in my U.S. Pat. No. 3,792,333. In the present case, the feed pulses FP outputted by the vector velocity control VVC not only enable the path generator, but also enable the offset generator OG via gate G13.

At the completion of every programmed motion (considering R ≠ 0) the following occurs :

1. Flip-flop FF2 is set to its ROTATE state, thereby turning on gate G13 and turning off gates G11 and G12 as described above.
2. Registers $X_T$, $Y_T$ and E$\alpha$ of the offset angle comparator OAC (FIG. 2) are cleared ($X_T$, $Y_T$, E$\alpha$ = 0)
3. The program input 2 then supplies data for the next motion to the linear path generator $LPG_X$, $LPG_Y$ of the PTGS system, which may be a part of the N/C unit. This data is so routed even if the next motion is a circular arc or some other curved path. The data loaded into the linear path generator is that which defines the initial slope of the next programmed motion, i.e., the quantities shown in FIG. 3a as $X_T$ and $Y_T$.

4. The output of the linear path generator LPG$_X$, LPG$_Y$ is routed to supply the offset angle comparator OAC with the $\Delta X_T$ and $\Delta Y_T$ axes pulses.
5. The $\Delta X_R$ and $\Delta Y_R$ offset pulses produced by the offset generator OG is routed to the vector velocity control system VVC, which may also be a part of the N/C unit, the feedrate data also being loaded with the programmed velocity in its normal operation.
6. The feed pulses FP from the vector velocity control VVC gate the operation of the linear path generator and of the offset generator OG as described earlier.
7. The generated programmed path axes-pulses, $\Delta X_G$ and $\Delta Y_G$ are inhibited from being supplied to the output mixer OM.

Initially, the offset generator quantities $X_R$, $Y_R$ will define the offset vector R so that it is normal to the slope of the just completed motion. The linear path generator operating as described above will produce the equivalent of a straight line vector that defines the normal to the linear direction of the next programmed motion. The control illustrated in FIG. 6 causes the offset generator OG to rotate the offset vector R at the programmed velocity until its angle $\alpha_r$ matches or just passes the angle $\alpha_T$ of that normal. After that is achieved, the next programmed motion will be allowed to be generated by the path generator, Of course, the matching of the angles means both $\alpha_R$ and $\alpha_T$ must not only be equal in magnitude but also must lie in the same quadrant. If that is not so, the offset vector generated by offset generator OG will have to rotate the vector to cross an axis to bring it to the proper quadrant. The block diagram of FIG. 6 assumes both angles are in the same quadrant for the sake of clarifying the more critical aspects of the operation of the system.

The slope-discontinuity control illustrated in FIG. 6 operates in the following manner:

The vector velocity control system VVC produces a feed pulse FP which enables the linear path generator LPG$_X$, LPG$_Y$ and the offset generator OG. The linear path generators produce $\Delta X_T$ and/or $\Delta Y_T$ pulses that are supplied to the offset angle comparator OAC. Comparator OAC, operating in the manner described earlier, will produce either a CW or a CCW depending on the sign of its register E$_\alpha$. Offset generator OG will rotate the offset vector as it has been commanded and in the process it generates $\Delta X_R$ or $\Delta Y_R$ offset axes-pulses. Those pulses are supplied to:

a. the outout mixer OM for driving the axes servos (14, FIG. 1);
b. the vector velocity control VVC, which thereby monitors the rate of motion and produces the feed pulses FP at the proper rate so that the velocity will be as prescribed;
c. and the offset angle comparator OAC, which thereby monitors the angle of the offset vector with respect to that of the normal to the next programmed motion (defined by the output from the linear path generator).

The above process will continue until the change of sign detector D3 indicates from register E$_\alpha$ of comparator OAC that the offset vector angle R has reached and just passed angle $\alpha_T$. When that occurs flip-flop FF2 will be reset to ROTATE; and this operation is completed.

FIG. 7 illustrates an example of the slope-discontinuity control operation when the program stores include three successive linear paths wherein : Block 1 : X0, Y+2; Block 2 : X−6, Y+20; and Block 3 : X−85, Y+33; and wherein the prescribed offset R = 28. Table 3 is a numberical tabulation of the example between programmed Blocks 1 and 2.

TABLE 3

| LINEAR GENERATOR | | | | | CIRCULAR GENERATOR | | | | | ANGLE |
|---|---|---|---|---|---|---|---|---|---|---|
| $\Delta X_T$ | XT | $\Delta YT$ | YT | $E_{\alpha^1}$ | $\Delta X_R$ | XR | $\Delta Y_R$ | $Y_R$ | $E_{\alpha^2}$ | $\alpha_R$ |
| 0 | 0 | 0 | 0 | 0 | 0 | 28 | 0 | 0 | 0 | 0 |
| 0 |   | 1 | 1 | +28 | 0 |   | 1 | 1 | +27 |   |
| 1 | 1 | 0 |   | +26 | 0 |   | 1 | 2 | +25 |   |
| 1 | 2 | 0 |   | +23 | 0 |   | 1 | 3 | +21 |   |
| 1 | 3 | 0 |   | +18 | 0 |   | 1 | 4 | +15 |   |
| 1 | 4 | 0 |   | +11 | 0 |   | 1 | 5 | + 7 |   |
| 0 |   | 1 | 2 | +35 | −1 | 27 | 0 |   | +33 |   |
| 1 | 5 | 0 |   | +28 | 0 |   | 1 | 6 | +23 |   |
| 1 | 6 | 0 |   | +17 | 0 |   | 1 | 7 | +11 | 14,534° |
| 1 | 7 | 0 |   | + 4 | 0 |   | 1 | 8 | − 3 | 16,504° |
| 0 |   | 1 | 3 | 0 | 0 |   | 1 | 9 |   | 18.435° |
| 1 | 8 | 0 |   | −1 | 26 |   | 0 |   |   |   | where:

$$E_{\alpha^1} = E_{\alpha^2} + \Delta Y_T \cdot X_R - \Delta X_T \cdot Y_R$$
$$E_{\alpha^2} = E_{\alpha^1} - \Delta Y_R \cdot X_T + \Delta X_R \cdot Y_T$$

The programmed linear motion has an angle of $$\alpha_T = \text{ARC TAN } 6/10 = 16.669°$$

Table 4 elow is the numerical tabulation of the example of FIG. 7 between programmed blocks 2 and 3 wherein :

programmed angle,$\alpha_T$ = arc tan 85/33 = 68.782°

TABLE 4

| LINEAR GENERATOR | | | | | CIRCULAR GENERATOR | | | | | ANGLE |
|---|---|---|---|---|---|---|---|---|---|---|
| $\Delta X_T$ | $X_T$ | $\Delta Y_T$ | $Y_T$ | $E_{\alpha^1}$ | $\Delta X_R$ | $X_R$ | $\Delta Y_R$ | $Y_R$ | $E_{\alpha^2}$ | $\alpha_R$ |
| 0 | 0 | 0 | 0 | 0 | 0 | 27 | 0 | 8 | 0 | 16.504° |
| 0 |   | 1 | 1 | + 27 | 0 |   | 1 | 9 | + 27 |   |
| 1 | 1 | 0 |   | + 18 | −1 | 26 | 0 |   | + 17 |   |
| 0 |   | 1 | 2 | + 43 | 0 |   | 1 | 10 | + 42 |   |
| 0 |   | 1 | 3 | + 68 | 0 |   | 1 | 11 | + 67 |   |
| 1 | 2 | 0 |   | + 56 | 0 |   | 1 | 12 | + 54 |   |
| 0 |   | 1 | 4 | + 80 | −1 | 25 | 0 |   | + 76 |   |
| 0 |   | 1 | 5 | +101 | 0 |   | 1 | 13 | + 99 |   |
| 0 |   | 1 | 6 | +124 | 0 |   | 1 | 14 | +122 |   |
| 1 | 3 | 0 |   | +108 | −1 | 24 | 0 |   | +102 |   |
| 0 |   | 1 | 7 | +126 | 0 |   | 1 | 15 | +123 |   |
| 0 |   | 1 | 8 | +147 | −1 | 23 | 0 |   | +139 |   |
| 1 | 4 | 0 |   | +124 | 0 |   | 1 | 16 | +120 |   |
| 0 |   | 1 | 9 | +143 | 0 |   | 1 | 17 | +139 |   |
| 0 |   | 1 | 10 | +162 | −1 | 22 | 0 |   | +152 |   |
| 0 |   | 1 | 11 | +174 | 0 |   | 1 | 18 | +170 |   |
| 1 | 5 | 0 |   | +152 | −1 | 21 | 0 |   | +141 |   |
| 0 |   | 1 | 12 | +162 | 0 |   | 1 | 19 | +157 |   |
| 0 |   | 1 | 13 | +178 | −1 | 20 | 0 |   | +165 |   |
| 1 | 6 | 0 |   | +146 | 0 |   | 1 | 20 | +140 |   |

TABLE 4-continued

| LINEAR GENERATOR | | | | | CIRCULAR GENERATOR | | | | | ANGLE |
|---|---|---|---|---|---|---|---|---|---|---|
| $\Delta X_T$ | $X_T$ | $\Delta Y_T$ | $Y_T$ | $E_{a^1}$ | $\Delta X_R$ | $X_R$ | $\Delta Y_R$ | $Y_R$ | $E_{a^2}$ | $\alpha_R$ |
| 0 | | 1 | 14 | +160 | −1 | 19 | 0 | | +146 | |
| 0 | | 1 | 15 | +165 | 0 | | 1 | 21 | +159 | |
| 0 | | 1 | 16 | +178 | −1 | 18 | 0 | | +162 | |
| 1 | 7 | 0 | | +141 | 0 | | 1 | 22 | +134 | |
| 0 | | 1 | 17 | +152 | −1 | 17 | 0 | | +135 | |
| 0 | | 1 | 18 | +152 | 0 | | 1 | 23 | +145 | |
| 0 | | 1 | 19 | +162 | −1 | 16 | 0 | | +143 | |
| 1 | 8 | 0 | | +120 | −1 | 15 | 0 | | +101 | |
| 0 | | 1 | 20 | +116 | 0 | | 1 | 24 | +108 | |
| 0 | | 1 | 21 | +123 | −1 | 14 | 0 | | +102 | |
| 1 | 9 | 0 | | + 78 | 0 | | 1 | 25 | + 69 | |
| 0 | | 1 | 22 | + 83 | −1 | 13 | 0 | | + 61 | |
| 0 | | 1 | 23 | + 74 | −1 | 12 | 0 | | + 51 | |
| 0 | | 1 | 24 | + 63 | 0 | | 1 | 26 | + 54 | 65.225° |
| 1 | 10 | 0 | | + 28 | −1 | 11 | 0 | | + 4 | 67.068° |
| 0 | | 1 | 25 | + 15 | −1 | 10 | 0 | | − 10 | 68.963° |
| 0 | | 1 | 26 | | −1 | 9 | 0 | | | 70.907° |

It will be noted from both Tables 3 and 4 that the change of sign of register E occurred when angle $\alpha_R$ was within one pulse of rotation of matching angle $\alpha_T$, thus showing the exact digital accuracy of the disclosed technique.

Figure 9:
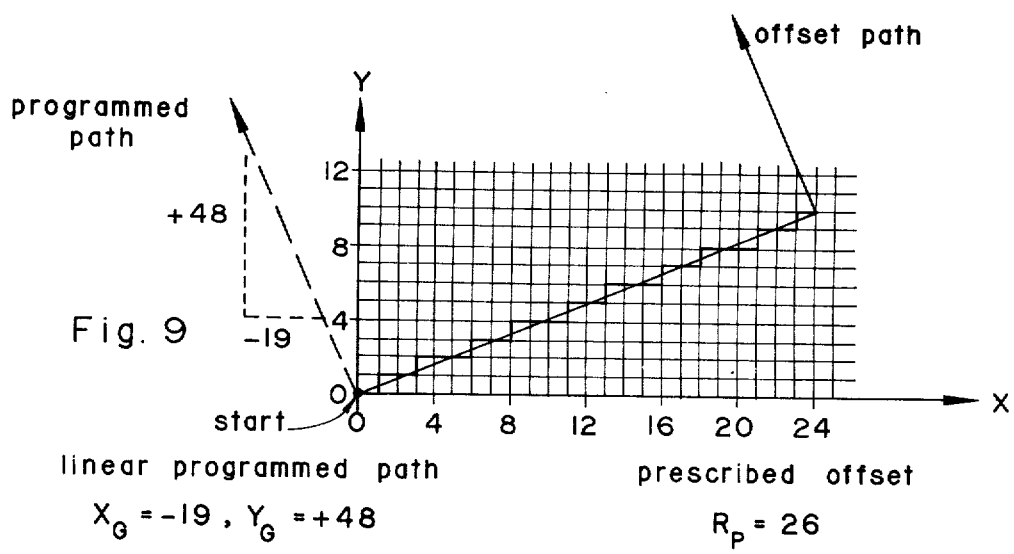
FIG. 9 is a diagram illustrating the tool offset turn-on operation.
Figure 8:
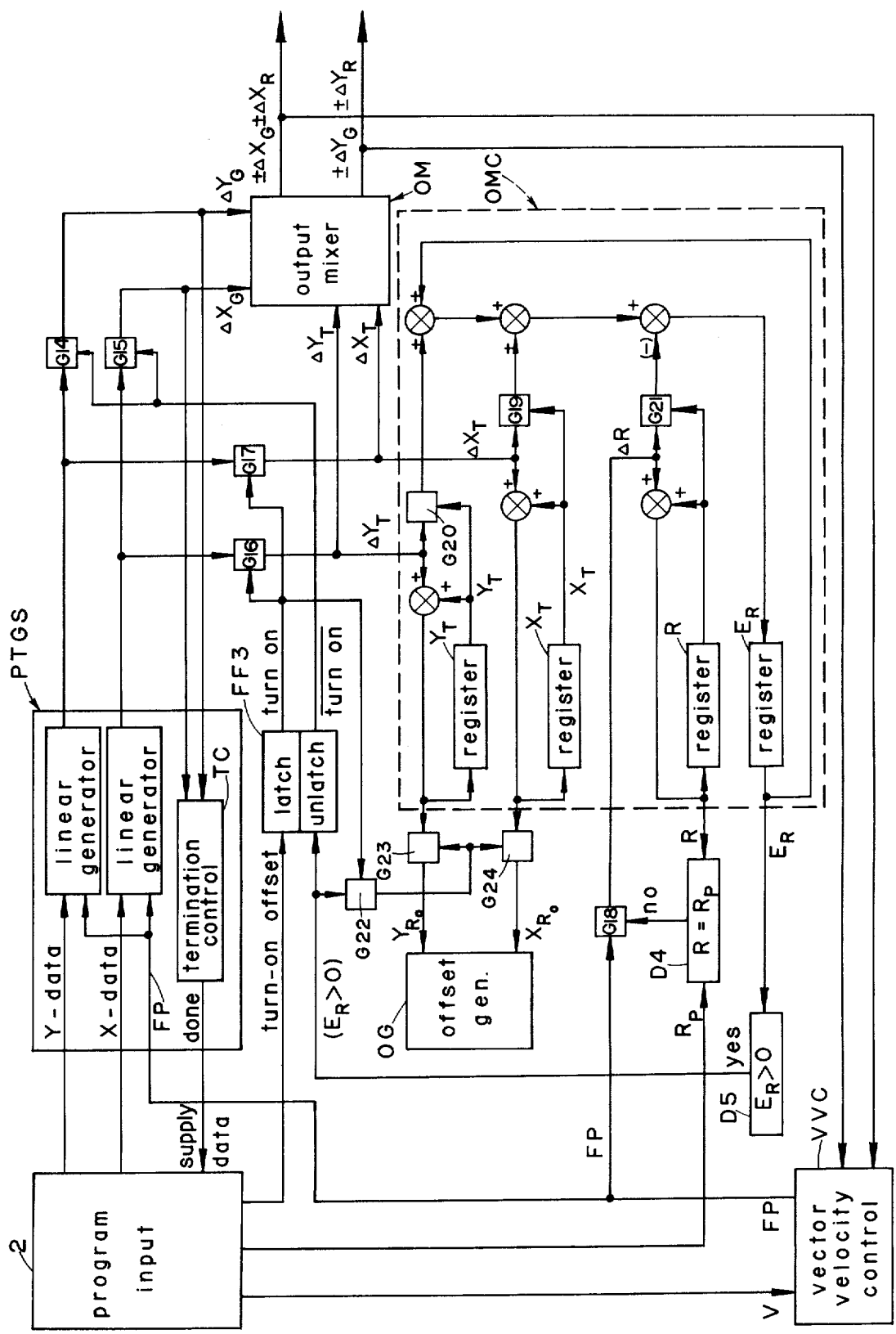
FIG. 8 is a block diagram of the portion of the offset path generating system involved in the offset turnoff and turn-off controls.

Offset Turn-On, Turn-Off Control (Figs. 8 and 9)

As noted earlier, the offset turn-on, turn-off control enables the offset to be turned on or turned off at any desired point in the programmed motion by merely including the appropriate instruction in the program and specifying the offset magnitude. The offset velocity can also be prescribed, by using the vector velocity control VVC briefly described earlier which determines the rate feed-pulses are issued to the path and offset generators.

The Offset Turn-On Instruction causes the system to inhibit the path generator from producing the programmed motion, while the offset generator generates ofset axes-pulses at the prescribed velocity until the offset vector is equal to the prescribed offset magnitude and is at a right angle to the slope of the current point of the programmed path of motion. When this is achieved, the turn-on is complete, and the path generator is then re-enabled to produce the programmed motion.

A similar operation is effected by an Offset Turn-Off Instruction. When this instruction is received, the system permits the associated motion command to be completed, and then holds up any further motion commands issued by the program while it enables the offset generator to supply offset axes-pulses to move the offset vector to zero magnitude, this also being done at the prescribed velocity. When the offset vector reaches zero, the Turn-Off is complete, and the program path generator is then re-enabled to supply the motion pulses.

It may be noted at this point that the above-described offset path generating system control and the offset slope-discontinuity control, together with the now-to-be-described offset turn-on, turn-off control, are mutually exclusive; that is, only one of such controls is operating at any one time. The logic hardware involved in each can therefore be time-shapred among the different controls. Since such time-sharing techniques are well known, they are not described herein, but the same reference numerals have generally been used to identify common units or sub-systems involved in the operation of the various controls.

Thus, the block diagram of FIG. 8 illustrating the offset turn-on and turn-off controls includes the program input 2, the programmed path and tangent generator system PTGS, the offset generator OG, the output mixer OM, and the vector velocity control VVC, all of which have been described above with respect to the other offset controls.

The system illustrated in FIG. 8 further includes a turn-on-offset latch FF3 controlled by an offset Turn-On Instruction from the program input 2. When latch FF3 is turned-off ($\overline{TURNON}$) it opens a pair of gates G14, G15 from the path generator system PTGS, permitting the programmed path pulses $\Delta X_G$, $\Delta Y_G$ to be supplied to the output mixer OM; but when latch FF3 is turned-on, gates G14, G15 are closed, and two further gates G16, G17 are opened to route the tangent pulses $\Delta X_T$, $\Delta Y_T$ to an offset vector magnitude comparator OMC. The latter comparator receives, in addition to the above-described tangent axes-pulses, also the $\Delta R$ pulses from the offset generator OG. It also receives $R\alpha$ data from the program input 2, the latter data prescribing the programmed distance for the offset.

The following operations are then performed:

1. the $\Delta R$, $\Delta X_T$ and $\Delta Y_T$ pulses are accumulated in the respective registers R, $X_T$, $Y_T$ of magnitude comparator OMR;
2. magnitude comparator OMR recognizes when the accumulation of $\Delta R$ pulses has reached the value of the programmed offset distance $R_P$, and inhibits further R pulses;
3. comparator OMR determines when the accumulation of the $\Delta X_T$ and $\Delta Y_T$ axes-pulses produces a vector distance equal or just greater than the accumulation of the $\Delta R$ pulses (which in turn is equal to the prescribed offset magnitude); and when it so determines, this indicates that the Offset Turn-On Operation has been completed.

With the indication from the offset magnitude comparator OMC that the Turn-On Operation has been completed, the following will occur:

a. further generation of $\Delta X_T$ and $\Delta Y_T$ axes-pulses stops;
b. the accumulation of the $\Delta X_T$ and $\Delta Y_T$ pulses (registers $X_T$ and $Y_T$) is loaded into the offset generator OG for retention as the initial values that define angle $\alpha_R$;
c. registers $X_T$ and $Y_T$ are cleared;
d. the routing path of $\Delta X_T$ and $\Delta Y_T$ pulses to the output mixer OM is aborted, and the normal operation of the programmed path generator system PTGS is restored.

The offset magnitude comparator OMC is shown in FIG. 8 as including four registers, $X_T$, $Y_T$, R, $E_R$. Register $X_T$ accumultes the $\Delta X_T$ pulses; register $Y_T$ accumulates the $\Delta Y_T$ pulses; and register R accumulates the $\Delta R$ pulses. A $\Delta R$ pulse is produced upon the occurence of each feed pulse FP from the vector velocity control VVC whenever the value in the R-register is not equal to the prescribed offset value $R\alpha$, this being implemented by equality detector D4 and gate G18.

The error register ER algebraically: (1) adds the $\Delta X_T$ pulses whenever a quantity is present in the $X_T$ register, this being implemented by gate G19; (2) adds the $\Delta Y_T$ pulses whenever a quantity is present in the $Y_T$ register, this being implemented by gate G 20; and (3) subtracts the $\Delta R$ pulses whenever a quantity is present in the R register, this being implemented by gate G21, the foregoing pulses being added into or subtracted from the error register ER such that the quantity in the error register always tends to move towards zero.

When the quantity in the error register ER passes zero, as detected by sign detector D5, a signal is produced from the latter to actuate flip-flop FF3 (TUR-NON), causing same to open gates G14, G15 for restoring the supply of the program pulses $\Delta X_G$, $\Delta Y_G$ to the output mixer OM, and to close gate G16, G17 to terminate the supply of the tangent pulses to the offset magnitude comparator OMR. At the same time, the signal from sign detector D5 also loads the offset generator OG with the initial offset quantities $Y_{RO}$, $X_{RO}$ (see below), this being implemented by gates G22, G23 and G24.

The circuit of FIG. 8 thus implements the following alogithms for the Turn-On Operation:

$$\underline{E_R \mid}_{old} + \Delta X_T \cdot X_T + \Delta Y_T \cdot Y_T - \Delta R \cdot R = \underline{E_R \mid}_{new} \quad (10)$$

where:
$X_T = \Sigma \Delta X_T$
$Y_T = \Sigma \Delta Y_T$
$R = \Sigma \Delta R$
$\Delta R =$ (Feed pulse) $\cdot (R \neq R_p)$
$\Delta X_T = k \cdot (Y\text{-data}) \cdot (\text{Feed Pulse})$
$\Delta Y_T = k \cdot (X\text{-data}) \cdot (\text{Feed Pulse})$
(Termination Condition) $= (E_R = 0)$ At the termination of the Turn-On Operation, a loading of the offset generator OG occurs so that:

$$Y_{RO} = Y_T$$
$$X_{RO} = T \quad (11)$$

The quantities shown above represent the following:
$\Delta X_T$, $\Delta Y_T =$ tangent axes-pulses that produce the path to the offset position
$R_p =$ programmed tool offset magnitude
$k =$ a constant related to the particular type linear path generator
$X$-Data, $Y$-Data = programmed data that define the required slope of the tool offset vector (see FIG. 5b)
$X_{RO}$, $U_{RO} =$ initial values of the offset generator OG
$R =$ current value of the offset vector during the Turn-On
$X_T$, $Y_T =$ current values of the axial components of the commanded offset turn-on path Note that the quantities R, $X_T$ and $Y_T$ are all positive numbers as used in the above algorithms. Likewise $\Delta R$, $\Delta X_T$ and $\Delta Y_T$ pulses have a value of ($\alpha$1) with the same pulse weight as the outputs from program path generator PTGS.

Utilizing the algorithms given above, FIG. 9 shows the graphical results of a numerical example of the offset Turn-On Operation wherein $X_G = -19 Y_G = +48$, $R_p = +26$; and Table 5 below is the tabulation of the numerical steps of that example, the calculated values being based on the conditions that must be achieved, namely:

$$(X_{RO})^2 + (Y_{RO})^2 = (R_p)^2$$

$$(X_{RO}) \div (Y_{RO}) = (Y\text{-Data}) \div (X\text{-Data}) \quad (12)$$

TABLE 5

| OFFSET | ERROR REG. | LINEAR SLOPE GENERATE | | | | | ERROR REG. |
|---|---|---|---|---|---|---|---|
| $\Delta R$ | R | $E_{R_1}$ | $\Delta X_T$ | $X_T$ | $\Delta Y_T$ | $Y_T$ | $E_{R_2}$ |
| 0 | 0 | 0 | 0 | 0 | 0 | 0 | 0 |

TABLE 5-continued

| OFFSET | ERROR REG. | LINEAR SLOPE GENERATE | | | | | ERROR REG. |
|---|---|---|---|---|---|---|---|
| $\Delta R$ | R | $E_{R_1}$ | $\Delta X_T$ | $X_T$ | $\Delta Y_T$ | $Y_T$ | $E_{R_2}$ |
| 1 | 1 | −1 | 1 | 1 | 0 | | 0 |
| 1 | 2 | −2 | 0 | | 1 | 1 | −1 |
| 1 | 3 | −4 | 1 | 2 | 0 | | −2 |
| 1 | 4 | −6 | 1 | 3 | 0 | | −3 |
| 1 | 5 | −8 | 0 | | 1 | 2 | −6 |
| 1 | 6 | −12 | 1 | 4 | 0 | | −8 |
| 1 | 7 | −15 | 1 | 5 | 0 | | −10 |
| 1 | 8 | −18 | 1 | 6 | 0 | | −12 |
| 1 | 9 | −21 | 0 | | 1 | 3 | −18 |
| 1 | 10 | −28 | 1 | 7 | 0 | | −21 |
| 1 | 11 | −32 | 1 | 8 | 0 | | −24 |
| 1 | 12 | −36 | 0 | | 1 | 4 | −32 |
| 1 | 13 | −45 | 1 | 9 | 0 | | −36 |
| 1 | 14 | −50 | 1 | 10 | 0 | | −40 |
| 1 | 15 | −55 | 1 | 11 | 0 | | −44 |
| 1 | 16 | −60 | 0 | | 1 | 5 | −55 |
| 1 | 17 | −72 | 1 | 12 | 0 | | −60 |
| 1 | 18 | −78 | 1 | 13 | 0 | | −65 |
| 1 | 19 | −84 | 0 | | 1 | 6 | −78 |
| 1 | 20 | −98 | 1 | 14 | 0 | | −84 |
| 1 | 21 | −105 | 1 | 15 | 0 | | −90 |
| 1 | 22 | −112 | 1 | 16 | 0 | | −96 |
| 1 | 23 | −119 | 0 | | 1 | 7 | −112 |
| 1 | 24 | −136 | 1 | 17 | 0 | | −119 |
| 1 | 25 | −144 | 1 | 18 | 0 | | −126 |
| 1 | 26 | −152 | 0 | | 1 | 8 | −144 |
| 0 | 26 | | 1 | 19 | 0 | | −125 |
| 0 | | | 1 | 20 | 0 | | −105 |
| 0 | | | 1 | 21 | 0 | | −84 |
| 0 | | | 0 | | 1 | 9 | −75 |
| 0 | | | 1 | 22 | 0 | | −53 |
| 0 | | | 1 | 23 | 0 | | −30 |
| | | | 0 | | 1 | 10 | −20 |
| | | | 1 | 24 | 0 | | +4 |

In the above example, the control algorithms produced the following axial components of the tool offset vector:

$$X_{RO} = 24, Y_{RO} = 10$$

The computed values for those quantities are:

calc. $X_{RO} = 24.1749$, calc. $Y_{RO} = 9.5693$

The above demonstrates that the above digital control algorithms to turn-on the tool offset produce the correct X-axis and Y-axis values within a single pulse.

While the turn-n Operation will, as has been demonstrated, cause angle $\alpha_R$ to match angle $\alpha_T$ within one pulse of the tool offset rotation, nevertheless it may be desirable to allow the offset angle comparator OAC to function during the Offset Turn-On Operation in the same manner as described above with reference to FIG. 2 during a slope-discontinuity operation. In this case, when the Turn-on is complete, the sign and the magnitude of register E$\alpha$ (FIG. 2) will indicate whether angle $\alpha_R$ or angle $\alpha_T$ is larger and to what extent even though angle $\alpha_R$ is digitally exact. By so doint doing will protect against the situation where there is more than one Turn-on Operation and each has an "error" of something less than a pulse of rotation, tending to accumulate to more than one.

To cause the offset angle comparator OAC to function during the Turn-on, it is necessary to recognize that the "$X_T$" and the "$Y_T$" needed by the angle comparator control is the Y-data and the X-data respectively shown on the block diagram of FIG. 8. Also it has to be noted, again referring to FIG. 8, that as far as the requirements of the angle comparator are concerned, the "$X_R$" and the "$Y_R$" it needs are the same as the $X_T$ and the $Y_T$ respectively shown on that diagram; while $\Delta X_T$ and $\Delta Y_R$ are identical, as are $\Delta Y_T$ and $\Delta Y_R$. The operation of the Turn-off is as follows:
1. From the program input 2, there will be supplied an instruction to turn-off the tool offset and the velocity required for the motion.
2. The tool offset generator OG will contain $X_R$ and $Y_R$, the axial components of the current tool offset vector. The programmed Turn-off command will cause that $X_R$ and $Y_R$ data to be loaded into the programmed path generator system PTGS and then to clear the tool offset generator OG.
3. The normal straight-line path generating operation will occur under control of the vector velocity control VVC, but with the signs of the pulses $\Delta X_G$ and $\Delta Y_G$ inverted.
4. When the Termination Control TC recognizes that the motion has been completed, further motion command pulses will not be generated, and the program input will be allowed to resume its normal operation.

While the invention has been described with respect to a preferred embodiment thereof, it will be appreciated that the invention, or various features thereof, could advantageously be used in other forms, and also that many variations and modifications can be made.

What is claimed is:
1. Apparatus for generating drive-pluses for producing an offset path of motion offset from a programmed path of motion by a prescribed magnitude, comprising:
  A. data input means for inputting data specifying the programmed path of motion and the prescribed offset magnitude;
  B. a programmed path generator generating program axes-pluses defining the programmed path of motion specified by the input data;
  C. an offset generator generating offset axes-pulses defining an offset vector of a magnitude equal to said prescribed offset magnitude;
  D. an output mixer algebraically combining the program axes-pulses and the offset axes-pulses and outputting same as the drive axes-pulses for producing said offset path of motion;
  E. and offset control means including: (i) a slope discontinuity control effective to control the offset path upon the inputting of a first programmed path of motion followed by a second programmed path of motion having a discontinuity in slope from the first programmed path of motion, said slope-discontinuity control being effective, upon generation of the axes-pulses for the completion of the first programmed path of motion;
    a. to disable the programmed path generator from supplying to the output mixer the program axes-pulses defining the second programmed path of motion;
    b. to enable the offset generator to supply to the output mixer sufficient offset axes-pulses to rotate the offset vector until it is at a predetermined angle related to the second programmed path of motion and at the prescribed offset magnitude therefrom;
    c. and then to re-enable the programmed path generator to supply to the output mixer the program axes-pulses defining the second programmed path of motion.

2. Apparatus as defined in claim 1, wherein said data input means (A) further inputs feedrate data specifying a prescribed offset velocity; and wherein said apparatus includes means controlling the offset generator to generate the offset axes-pulses at the prescribed offset velocity during the operation of the slope-discontinuity control.

3. Apparatus as defined in claim 1, wherein said data input means (A) further inputs an Offset Turn-On Instruction, and said offset control means (E) further includes (ii) an offset turn-on control effective, upon receipt of the Offset Turn-On instruction;
  a. to disable the programmed path generator from supplying the program axes-pulses to the output mixer;
  b. to enable the offset generator to supply the offset axes-pulses to the output mixer until the offset vector is equal to the prescribed offset magnitude and is at said predetermined angle of (E) (i) (b) to the current point on the programmed path of motion;
  c. and then to re-enable the programmed path generator to supply the program axes-pulses to the output mixer.

4. Apparatus as defined in claim 3, wherein said predetermined angle of (E) (ii) (b) is a right angle to the slope of the programmed path.

5. Apparatus as defined in claim 3, wherein said predetermined angle of (E) (ii) (b) is the polar angle of the programmed path.

6. Apparatus as defined in claim 3, wherein said data input means (A) further inputs a data Turn-Off Instruction, and wherein said offset control means (E) further includes (iii) an offset turn-off control effective upon receipt of said Offset Turn-Off Instruction;
  a. to disable the programmed path generator from supplying the program axes-pulses to the putput mixer;
  b. to enable the offset generator to supply offset axes-pulses to the output mixer to move the offset vector to zero magnitude;
  c. and then to re-enable the programmed path generator to supply the program axes-pulses to the output mixer.

7. Apparatus as defined in claim 6, wherein said data input means (A) further inputs feedrate data specifying a prescribed offset velocity; and wherein said apparatus further includes means controlling the offset generator to generate the offset axes-pulses at the prescribed offset velocity during the operation of the offset turn-on and turn-off controls.

8. Apparatus as defined in claim 1, wherein said predetermined angle of (E) (ii) (b) is a right angle to the tangent of the programmed path, and said offset control means (E) includes:
  a tangent vector generator generating tangent axes-pulses corresponding to the tangent angle of the tangent vector to the programmed path;
  and an angle comparator comparing the offset vector angle with said tangent angle and controlling the offset generator to cause the offset vector angle to follow the tangent angle.

9. Apparatus as defined in claim 8,
  wherein said offset generator (C) includes offset X-axis and Y-axis registers for accumulating the generated offset X-axes-pulses and Y-axes-pulses;
  and wherein said angle comparator includes X-axis and Y-axis registers for accumulating the tangent axes-pulses, and circuit means for causing the offset generator to generate X-axes-pulses and Y-axes-pulses in response to the generation of the tangent axes-pulses such that the offset vector angle defined by the quantities in said offset registers follows the tangent vector angle defined by the quantities in the said tangent registers.

10. Apparatus as defined in claim 9, wherein said latter circuit means includes:
a. an error register;
b. a sign detector;
c. a first circuit including a first gate for adding into the error register each tangent Y-axis-pulse upon the presence of a quantity in the offset X-axis register;
d. a second circuit including a second gate for subtracting from the error register each tangent Y-axis-pulse upon the presence of a quantity in the Y-axis offset register;
e. a third circuit including a third gate for substracting from the error register each offset Y-axis-pulse upon the presence of a quantity in the tangent X-axis register;
f. a fourth circuit including a fourth gate for adding into the error register each offset X-axis-pulse upon the presence of a quantity in the tangent Y-axis register;
g. means for producing a direction signal to the offset generator to rotate the offset circle vector in one direction when the error register is less than zero; and
h. means for producing the opposite direction signal to the offset generator to rotate the offset circle vector in the opposite direction when the error register is greater than zero.

11. Apparatus as defined in claim 10, wherein said offset control (E) further includes:
a. a bistable device settable to a rotate condition or to a NOT-ROTATE condition;
b. means effective upon the termination of each program motion;
1. to set the bistable device to its ROTATE condition;
2. to clear said tangent X-axis, Y-axis and error registers;
3. to disable the programmed path generator from generating the program axes-pulses supplied to the output mixer;
4. to enable said tangent vector generator to generate axes-pulses corresponding to the initial slope of the next programmed motion;
5. and to supply said latter axes-pulses to the output mixer and also to the tangent X-axis and Y-axis registers of the angle comparator;
c. means for causing the offset generator to generate offset X-axes-pulses and Y-axes-pulses to rotate the offset vector until its angle matches that of the tangent vector;
d. and means then to reset the bistable device to its NOT-ROTATE condition and to re-enable the programmed path generator to generate the program axes-pulses supplied to the output mixer.

12. Apparatus as defined in claim 11, wherein said data input means further inputs feedrate data specifying a prescribed offset velocity, and wherein said circuit means causes the offset generator to generate the offset X-axis and Y-axis pulses at a rate to rotate the offset vector at the prescribed offset velocity.

13. Apparatus as defined in claim 6, wherein said offset turn-on control (E) (ii) and turn-off control (E) (iii) comprise:

a. a tangent vector generator generating tangent axes-pulses corresponding to the angle of the tangent to the programmed path;
b. means effective upon the receipt of an Offset Turn-On instruction to disable the programmed path generator from generating program axes-pulses supplied to the output mixer and to enable the tangent vector generator to generate axes-pulses supplied to the output mixer;
c. an offset vector magnitude comparator determining when the generated tangent axes-pulses produce a vector magnitude equal to the prescribed offset magnitude;
d. and means then to re-enable the programmed path generator to generate the program axes-pulses supplied to the output mixer.

14. Apparatus as defined in claim 13,
wherein the said input means further includes feedrate data specifying a prescribed offset velocity;
wherein said apparatus further includes a vector velocity control which monitors the drive axes-pulses, compares the resultant vector velocity with the prescribed offset velocity, and produces feed pulses in response thereto;
and wherein means are provided for routing said feed pulses to the tangent vector generator and to the offset vector magnitude comparator to control the operations thereof.

15. Apparatus for generating drive axes-pulses for producing an offset path of motion offset from a programmed path of motion by a prescribed magnitude, comprising:
A. data input means for inputting data specifying the programmed path of motion, an Offset Turn-On Instruction, and the prescribed offset magnitude;
B. a programmed path generator generating program axes-pulses defining the programmed path of motion specified by the input data;
C. an offset generator generating offset axes-pulses defining an offset vector of a magnitude equal to said prescribed offset magnitude;
D. an output mixer algebraically combining the program axes-pulses and the offset axes-pulses and outputting same as drive axes-pulses for producing said offset path of motion;
E. and offset control means including an offset turn-on control effective, upon receipt of the Offset Turn-On Instruction;
a. to disable the programmed path generator from supplying the program axes-pulses to the output mixer;
b. to enable the offset generator to supply the offset axes-pulses to the output mixer until the offset vector is equal to the prescribed offset mganitude and is at a said predetermined angle to the current point on the programmed path of motion;
c. and then to re-enable the programmed path generator to supply the program axes-pulses to the output mixer.

16. Apparatus as defined in claim 15, wherein said data input means (A) further inputs an Offset Turn-Off instruction, and wherein said offset control means (E) further includes an offset turn-off control effective, upon recepit of said Offset Turn-Off instruction:
a. to disable the programmed path generator from supplying the program axes-pulses to the output mixer;

b. to enable the offset generator to supply offset axes-pulses to the output mixer to move the offset vector to zero magnitude;

c. and then to re-enable the programmed path generator to supply the program axes-pulses to the output mixer.

17. Apparatus as defined in claim 16, wherein said data input means (A) further inputs feedrate data specifying a prescribed offset velocity; and wherein said apparatus further includes means controlling the offset generator to generate the offset axes-pulses at the prescribed offset velocity during the operation of the offset turn-on and turn-off controls.

18. Apparatus as defined in claim 16, wherein said predetermined angle of E (b) is a right angle to the slope of the programmed path.

19. Apparatus as defined in claim 18, wherein said offset control means (E) includes:

a tangent vector generator generating tangent axes-pulses corresponding to the tangent angle of the tangent vector to the programmed path;

and an angle comparator comparing the offset vector angle with said tangent angle and controlling the offset generator to cause the offset vector angle to follow the tangent angle.

20. Apparatus as defined in claim 19, wherein said offset generator (C) includes offset X-axis and Y-axis registers for accumulating the generated offset X-axis-pulses and Y-axis-pulses;

and wherein the said angle comparator includes X-axis and Y-axis registers for accumulating the tangent axes-pulses; and circuit means for causing the offset generator to generate X-axes-pulses and Y-axes-pulses in response to the generation of the tangent axes-pulses such that the offset vector angle defined by the quantities in said offset registers follows the tangent vector angle defined by the quantities in said tangent registers.

21. Apparatus as defined in claim 18, wherein said offset turn-on and turn-off controls comprise:

a. a tangent vector generator generating tangent axes-pulses corresponding to the angle of the tangent to the programmed path;

b. means effective upon the receipt of an Offset Turn-On instruction to disable the programmed path generator from generating program axes-pulses supplied to the output mixer and to enable the tangent vector generator to generate axes-pulses supplied to the output mixer;

c. an offset vector magnitude comparator determining when the generated tangent axes-pulses produce a vector magnitude equal to the prescribed offset magnitude;

d. and means to then re-enable the programmed path generator to generate the program axes-pulses supplied to the output mixer.

22. Apparatus as defined in claim 21, wherein said data input means further includes feedrate data specifying a prescribed offset velocity, wherein said apparatus further includes a vector velocity control circuit which monitors the drive axes-pulses, compares the resultant vector velocity with the prescribed offset velocity, and produces feed pulses in response thereto;

and wherein means are provided for routing said feed pulses to the tangent vector generator and to the offset vector magnitude comparator to control the operations thereof.

* * * * *